UNITED STATES PATENT OFFICE.

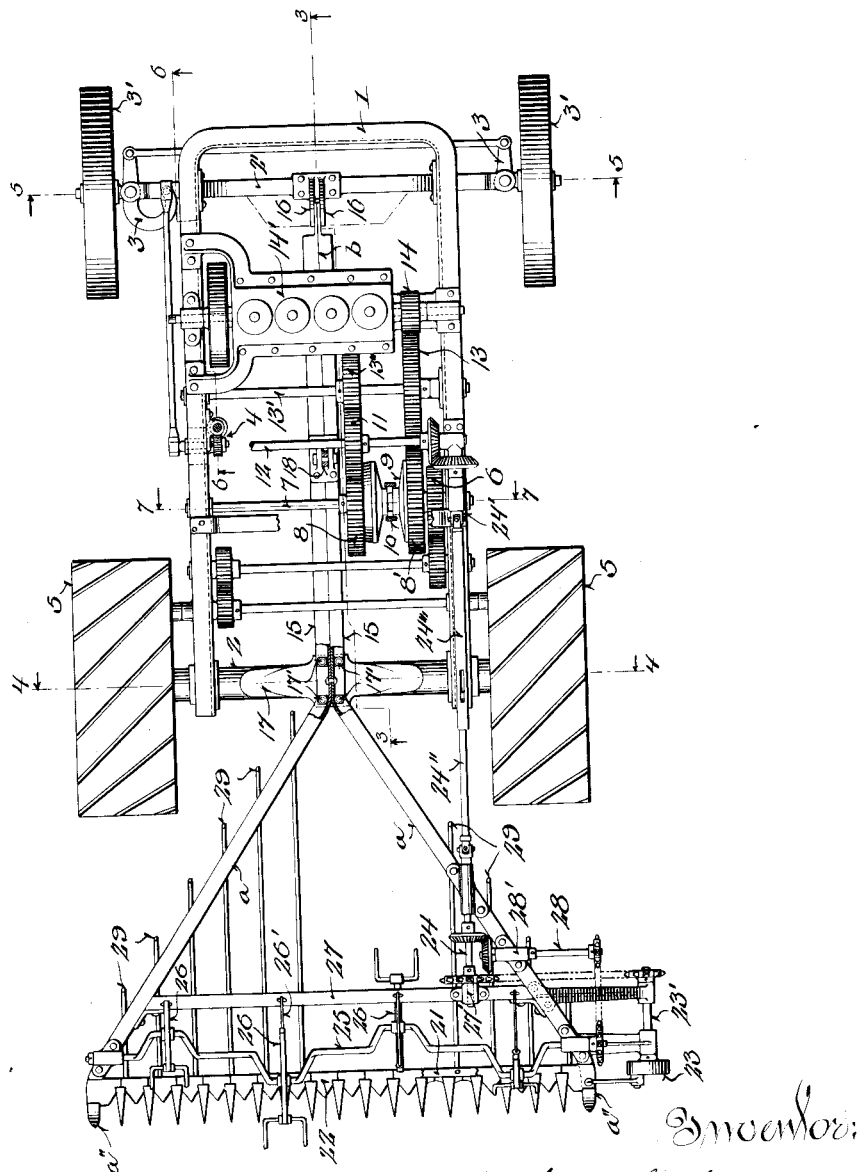

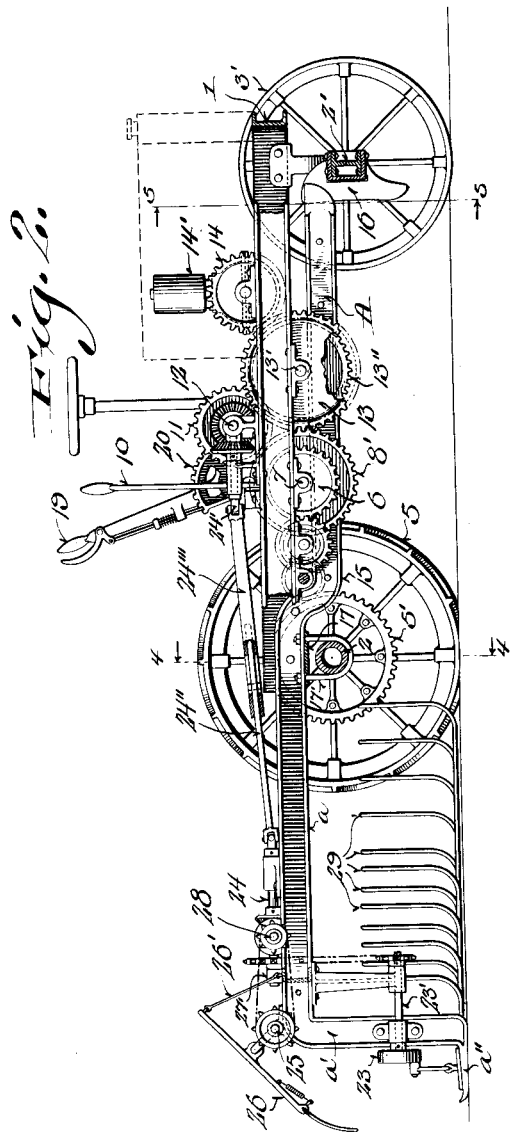

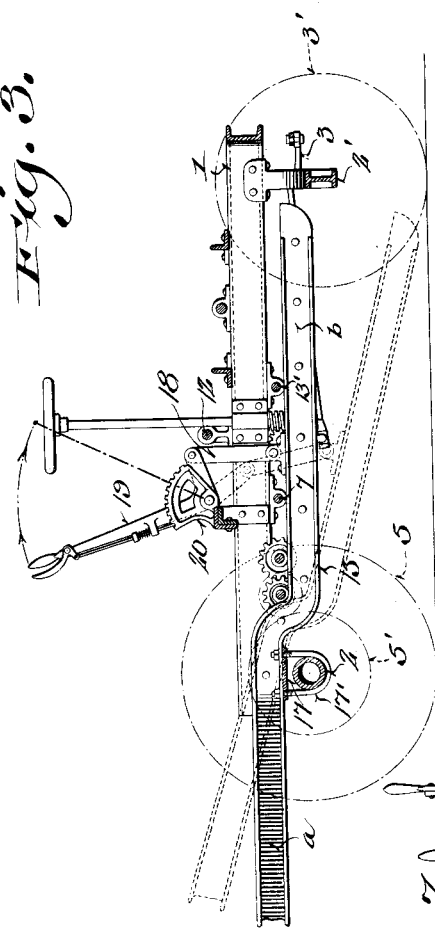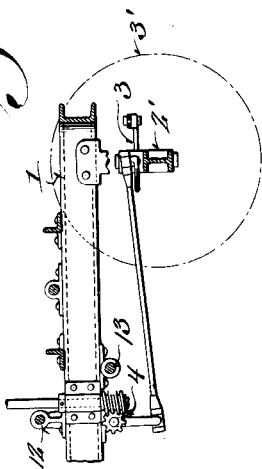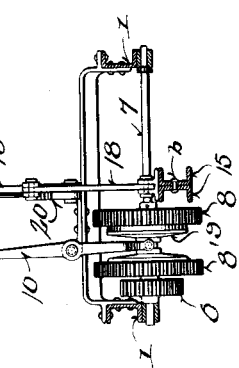

WILBUR L. FRIDAY, OF BEAVER DAM, WISCONSIN.

HARVESTER.

1,109,916.  Specification of Letters Patent.  Patented Sept. 8, 1914.

Application filed February 24, 1914. Serial No. 820,539.

*To all whom it may concern:*

Be it known that I, WILBUR L. FRIDAY, a citizen of the United States, and resident of Beaver Dam, in the county of Dodge and State of Wisconsin, have invented certain new and useful Improvements in Harvesters; and I do hereby declare that the following is a full, clear, and exact description thereof.

My invention refers to tractor-propelled harvesters and has for its object to provide a simple, economical and effective machine of the above character, which machine is especially adapted for harvesting green peas, clover, timothy or short grain.

The specific objects of my invention are to provide a thrust-frame in connection with the tractor for carrying the harvester mechanism, provision being made in connection with the frame and tractor whereby said frame is both yieldingly and oscillatorily supported by the tractor to thus absorb shock and permit compensation incidental to rise and fall of said tractor. A further provision is made for adjusting the frame vertically, whereby the harvester or cutting apparatus carried thereby is raised or lowered to gage the depth of cut.

Another object of my invention is to provide a simple and effective compensating driving connection in the form of a tumbler-rod between the source of power and the cutting apparatus.

With the above and other objects in view the invention consists in certain peculiarities of construction and combination of parts as hereinafter set forth with reference to the accompanying drawings and subsequently claimed.

In the drawings Figure 1 represents a plan view of a harvester embodying the features of my invention with portions broken away and other portions in section to more clearly illustrate minor details of construction; Fig. 2, a side elevation of the same with parts broken away and in section to show details of construction more clearly; Fig. 3, a detailed sectional elevation of the tractor truck with a portion of the harvester frame which is carried by said truck, the section being indicated by line 3—3 of Fig. 1; Figs. 4, 5 and 7 are detailed cross-sections of the tractor portion of the harvester, the sections being indicated by lines 4—4, 5—5 and 7—7, respectively of Fig. 1, and Fig. 6, a detailed longitudinal sectional view taken through a portion of the tractor truck and illustrating the steering gear, the section being indicated by line 6—6 of Fig. 1.

Referring by characters to the drawings, 1 represents a truck-frame provided with standard type of front and rear axles 2, 2', respectively, the rear axle being provided with connected knuckles 3, upon which are mounted steering wheels 3'. One of the knuckles is also connected to a standard type of steering gear 4, as best shown in Figs. 1 and 3 of the drawings.

The front axle carries tractor-wheels 5 having toothed gear-wheels 5', whereby motion is imparted to the wheels through a suitable gear-train mounted upon the tractor truck, the said gear-train being arranged to receive motion from a gear-wheel 6. The gear-wheel 6 is secured to a shaft 7, bearings for which are provided upon the truck. This shaft 7 also carries a pair of loose oppositely rotative clutch gear-wheels 8, 8', having clutch-members in connection therewith for engagement with a double clutch-member 9, the same being splined upon the shaft 7 and under control of a lever 10. The clutch gear-wheel 8 is driven by an intermediate gear-wheel 11, fast on a counter-shaft 12, and a corresponding clutch-gear-wheel 8' is driven by a gear-wheel 13, which gear-wheel is mounted upon a main drive-shaft 13' that also carries a gear-wheel 13'', the same being meshed with the intermediate gear-wheel 11. By the above described driving gearing it is manifest that the gear-wheels 8 and 8' are driven in opposite directions and when selectively engaged by the clutch-member 9 they cause the shaft 7 to rotate in opposite directions, whereby the tractor will be propelled forwardly or backwardly. The main drive-shaft 13' is, in turn, driven by a pinion 14, which is carried by the shaft of a motor 14', the said motor being suitably affixed to the truck-frame 1.

All of the above described power transmission mechanism forms no part of my invention except so far as it is utilized in the general construction to provide a practical tractor-driven harvester machine.

The front truck-axle 2 serves as a fulcrum point for an oscillatory cutter carrying frame, which frame is composed of a pair of struts 15, 15, that are extended forwardly of the axle in the form of V-shaped spread legs *a, a*. The struts are nested together over said axle and from this point they are riveted or otherwise secured and extended rearwardly and centrally of the truck in the form of a single reach-bar *b*. The end of the reach-bar portion *b* of the frame is adapted to play vertically between rub-plates 16, 16, which plates are secured to the rear axle 2', and, by this construction, side-play of the frame relative to the truck is eliminated.

A bowed leaf-spring 17 is fitted between the front axle 2 and the frame reach-bar *b*. The bowed ends of the spring are slightly concavo-convexed in cross-section, whereby they nest snugly upon the curved face of the axle, which, as shown, is in the form of a circular sleeve. This leaf-spring 17 and also the reach-bar *b* are confined to the front axle by U-shaped clip-bolts 17', which bolts are looped about the axle and are secured to the reach-bar by suitable nuts. Hence it will be observed that the cutter-frame is both oscillatorily and yieldingly supported upon the front axle.

A link 18 is pivotally secured to the reach-bar *b* intermediate of its length and the opposite end of said link is secured to a detent-carrying bell-crank lever 19, which lever is pivotally mounted upon a bracket 20, the same being secured to the frame and provided with a toothed segment for locking engagement with the lever-detent. By the above described equipment it is apparent that the forward or cutter-carrying end of the oscillatory frame can be raised or lowered relative to the ground and may be locked in the desired position.

The outer ends of the frame-legs *a* are bent downwardly to form boot-sections *a'*, which boot-sections terminate with forwardly extending ground-shoes *a''*. The shoes are connected by a finger-bar 21 carrying a standard type of guard-fingers and a cutter-bar 22. The cutter-bar 22 is reciprocated by a pitman in connection with a crank-disk 23, which crank-disk is secured to a pitman drive-shaft 23', the same being mounted in boxes carried by one of the leg-boots *a'* and a bracket that depends from the juxtaposed leg portion of the frame. The pitman-shaft 23' is in link-belt connection with one section 24 of a tumbler-shaft, which shaft section is mounted in a suitable bearing that is carried by the adjacent leg *a* of the frame. Another tumbler-shaft section 24' is mounted in a bearing supported by the truck-frame and this shaft-section is in miter-gear connection with the counter-shaft 12, as best shown in Fig. 2. The shaft-sections 24, 24', are connected by toggles to male and female tumbler-shaft sections 24'', 24''', respectively, which sections telescope each other and are splined together to permit endwise movement of the telescoped shaft coincident to rise and fall of the cutter-carrying frame.

At the junction of the boot portions *a'* and leg portions *a* of the frame, journal boxes are provided for a crank-shaft 25, which crank-shaft has pivoted thereon a series of tedder-forks 26. The upper ends of the tedder-forks are connected by links 26' to a transverse brace-bar 27 that connects the outer flared ends of the frame-legs *a* and this brace-bar also carries a companion box 27' for the tumbler-shaft section 24. Motion is imparted to the crank-shaft 25 by a chain and sprocket-gear connection with a stud-shaft 28, which stud-shaft is mounted in a journal-box 28' that is secured to one of the frame-legs *a*, the said stud-shaft being in miter-gear connection with the tumbler-shaft section 24. The finger-bar 21 carries two series of flexible guard-plates 29, which series are spaced apart centrally of the cutting apparatus and are shortened in length step by step toward the outer end of the cutter-bar, whereby pea-vines, or other products being harvested, are caught rearwardly of the cutting mechanism and rolled or deflected into a single windrow between the drive-wheels of the tractor. Hence it will be seen that, owing to the front cut harvester mechanism and its arrangement, the tractor has a clear field of stubble over which to travel, while the grain or vines being harvested will be piled in a single windrow, which will be straddled by the tractor wheel.

It is apparent that, when the harvester is utilized for cutting peas or analogous products, the ends of the tedder-forks will describe imaginary ellipses and will thereby move forward to pick up the vines or grain and positively deliver it to the cutting apparatus and, after being cut, the product will be thrown rearwardly by said tedder-forks to be thereafter formed into a windrow.

From the foregoing description it is obvious that the motor-propelled truck will also transmit motion to the cutting apparatus and that vibration incidental to rise and fall of the traction wheels 5 will be compensated for by the yieldable and oscillatory pivot connection between the cutter-carrying frame and the axle or any analogous fixed cross-member of the truck, the pivotal connection between the reach-bar and truck-frame comprising the link 18 permitting this yieldable movement of the cutter-carrying frame.

I claim:

1. The combination of a harvester comprising a tractor having a truck and front and rear axles therefor, a cutter-carrying frame having a reach-bar extending over the front axle and provided with legs projecting forwardly of the axle, cutter-mechanism carried by the frame-legs, an adjustable pivot connection between the reach-bar and truck-frame, and a yielding pivotal connection between the front axle and cutter-carrying frame intermediate of the cutting apparatus and adjustable pivot connection aforesaid.

2. The combination of a harvester comprising a tractor having a wheel-supported truck and front and rear axles for said wheels, a cutter-carrying frame in advance of the truck having a reach-bar extending rearwardly of said truck and over the front axle, a leaf-spring fitted between the reach-bar and axle, means for pivotally confining the reach-bar and axle together whereby said reach-bar is adapted to rise and fall under control of the leaf-spring, and means connecting the rear end of the reach-bar and truck-frame for raising and lowering the forward end of the cutter-carrying frame.

3. The combination of a harvester comprising a tractor having a truck provided with front and rear axles, a cutter-carrying frame extending forwardly of the truck having a reach-bar extending over the front axle and rearwardly of the frame, guides carried by the truck for engagement with the rear end of the reach-bar, a leaf spring secured to the reach-bar having concavo-convexed ends engageable with the front axle, and clip-bolts surrounding said front axle in engagement with said reach-bar.

In testimony that I claim the foregoing I have hereunto set my hand at Beaver Dam, in the county of Dodge and State of Wisconsin in the presence of two witnesses.

WILBUR L. FRIDAY.

Witnesses:
J. F. MALONE,
J. E. MALONE.